United States Patent [19]

Novicky

[11] Patent Number: 4,743,106
[45] Date of Patent: May 10, 1988

[54] HIGHLY OXYGEN PERMEABLE CONTACT LENS MATERIALS AND COMPOSITIONS THEREOF

[75] Inventor: Nick N. Novicky, Calgary, Canada

[73] Assignee: Maureen J. Devou, Alberta, Canada

[21] Appl. No.: 880,668

[22] Filed: Jun. 30, 1986

[51] Int. Cl.[4] ........................ G02C 7/04; C08F 230/08
[52] U.S. Cl. ................................. 351/160 R; 526/279; 351/160 H
[58] Field of Search ................... 526/279; 351/160 H, 351/160 R

[56] References Cited

U.S. PATENT DOCUMENTS

| | | | |
|---|---|---|---|
| 2,538,100 | 1/1951 | Irany | 526/286 |
| 2,793,223 | 5/1957 | Merker | 526/279 |
| 3,594,353 | 7/1971 | Domba | 526/242 |
| 4,182,822 | 1/1980 | Chang | 526/279 |
| 4,216,303 | 8/1980 | Novicky | 526/279 |
| 4,246,389 | 1/1981 | Le Boeuf | 526/279 |
| 4,424,328 | 1/1984 | Ellis | 526/279 |
| 4,500,695 | 2/1985 | Ivani | 526/279 |
| 4,508,884 | 4/1985 | Wittmann | 526/279 |
| 4,614,777 | 9/1986 | Kania | 526/279 |

Primary Examiner—Christopher Henderson
Attorney, Agent, or Firm—Stevens, Davis, Miller & Mosher

[57] ABSTRACT

Highly oxygen permeable hard and semi-hard contact lenses are made from the copolymer of ethylenically unsaturated siloxanylalkoxy ester monomer, ethylenically unsaturated flurocarbon ester monomer and/or ethylenically unsaturated sulfone monomer; the copolymer plastic can be modified by the incorporation of hardening, stability and/or wettability agents and methods for the manufacturing thereof.

2 Claims, No Drawings

HIGHLY OXYGEN PERMEABLE CONTACT LENS MATERIALS AND COMPOSITIONS THEREOF

BACKGROUND OF THE INVENTION

Oxygen permeable contact lenses in the prior art are essentially made from siloxane monomer and methyl methacrylate. These lenses are permeable to oxygen; hence, allowing oxygen from the air to pass through the lenses and reach the cornea which allows such lenses to be worn for longer periods of time as compared to non-oxygen permeable contact lenses such as PMMA which were available previously.

Such contact lenses were disclosed in the prior art by Gaylord, U.S. Pat. Nos. 3,808,178 and 4,120,570. Later, Ellis disclosed in his patents, U.S. Pat. Nos. 4,152,508 and 4,330,383, the partial replacement of the methyl methacrylate monomer with dimethyl itaconate. The Novicky patents, U.S. Pat. Nos. 4,216,303, 4,242,483, 4,248,989, 4,303,772 and 4,365,074, disclosed contact lenses comprised of high molecular weight of polysiloxanylalkyl esters of acrylic and methacrylic acids. The Chang patent, U.S. Pat. No. 4,182,822, disclosed contact lenses comprised of a copolymer from polysiloxanylalkyl ester of acrylic and methacrylic acid essentially the same as disclosed in the Gaylord patents, supra., that were copolymerized with N-vinyl pyrrolidinone or N,N-dimethyl methacrylamide.

In Ichinoche, et al., Canadian Pat. No. 1,184,341, it teaches the use of organosiloxanyl ester monomer of acrylic and methacrylic acid copolymerized with fluorocarbon ester monomers of acrylic and methacrylic acids and copolymerized to produce oxygen permeable contact lenses. The LeBoeuf patent, U.S. Pat. No. 4,246,389, discloses acrylic siloxane based polymers which also contain HEMA and/or polyvinyl 2-pyrrolidinone which are suitable for use in forming water-containing oxygen permeable contact lenses.

All siloxane ester monomers in the prior art employ essentially the same alkyl bridge between methacryloxy group and siloxanyl part of the structure; wherein, neither one used ethoxy group or 2,3-dioxypropyl groups. The organosilicone monomers of the present invention can be copolymerized with perfluoroalkyl ester monomers and/or with sulfone monomers.

SUMMARY OF THE INVENTION

The present invention relates to a novel and new generation of contact lenses comprising of copolymers made from siloxanylalkoxy ester monomers of acrylic, methacrylic and/or itaconic acids and mixtures thereof and perfluoroalkyl ester monomers of acrylic, methacrylic and/or itaconic acids and mixtures thereof which are copolymerized with ethylenically unsaturated sulfone alkyl monomers and/or ethylenically unsaturated sulfone ester monomers of acrylic, methacrylic and/or itaconic acids and mixtures thereof, to produce highly oxygen permeable and improved materials for contact lenses.

The first representative siloxanylalkoxy ester monomer of acrylic or methacrylic acid of the present invention has the general structural formula:

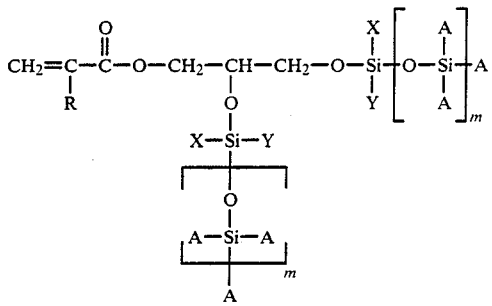

wherein X and Y are $C_1$ to $C_6$, alkyl, cyclic or phenyl groups and/or groups of the following structure:

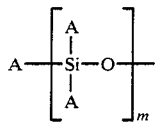

m being an integer from 1 to 5 and R is methyl group or hydrogen.

The second useful organosiloxanylalkoxy ester monomer of acrylic or methacrylic acid is represented by the following structural formula:

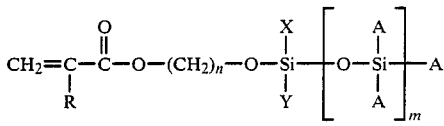

n being an integer from 1 to 3; wherein, X and Y are $C_1$ to $C_6$, alkyl, cyclic or phenyl groups and/or groups of the following structure:

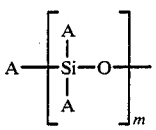

m being an integer from 1 to 5 and R is methyl group or hydrogen.

The above disclosed new organosilicone monomers can be partially substituted by additional organosiloxanylalkyl ester monomers from the prior art. The first representative partial substitute organosiloxanylalkyl ester monomer of acrylic and methacrylic acid from the prior art has the structural formula:

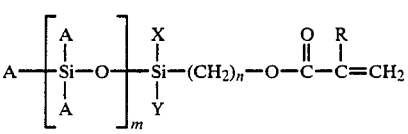

wherein, X and Y are $C_1$ to $C_6$, alkyl, cyclic or phenyl groups and/or groups of the following structure:

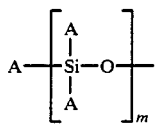

m being an integer from 1 to 6, n being an integer from 1 to 3 and R is methyl group or hydrogen.

The second useful partial substitute organosiloxanylalkyl ester monomer of acrylic and methacrylic acids is represented by the following formula:

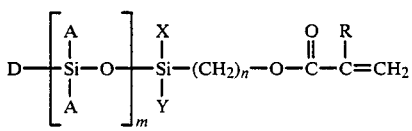

wherein, X and Y are $C_1$ to $C_6$, alkyl, cyclic or phenyl groups or groups of the following structure:

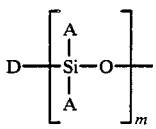

m being an integer from 1 to 6, n being an integer from 1 to 3, A is selected from $C_1$ to $C_6$, alkyl or phenyl groups, R is methyl group or hydrogen and D is hydrogen or hydroxy group.

The third useful partial substitute organosiloxanylalkyl ester monomer of acrylic and methacrylic acids is represented by the following structural formula:

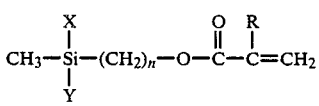

wherein, X and Y are groups of the following structure:

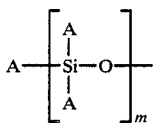

m being an integer from 1 to 5, n is an integer from 1 to 3; wherein, A is selected from $C_1$ to $C_6$, alkyl, cyclic or phenyl groups and R is methyl group or hydrogen.

The fourth useful partial substitute organosiloxanylalkyl ester monomer of itaconic acid is represented by the following formula:

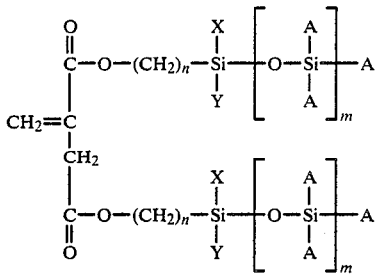

wherein, X and Y are $C_1$ to $C_6$, alkyl, cyclic or phenyl groups or groups of the following structure:

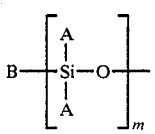

m being an integer from 1 to 5, n being an integer from 1 to 3; wherein, A is selected from $C_1$ to $C_6$, alkyl, cyclic or phenyl groups and B is methyl group, hydrogen or hydroxy group.

The perfluoroalkyl ester monomers of acrylic and methacrylic acid are represented by the following formula:

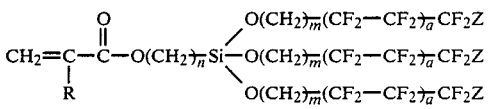

n being an integer from 1 to 3, R is methyl group or hydrogen, m being an integer from 1 to 4, a being an integer from 1 to 10 and Z is fluorine or hydrogen.

Another useful perfluoroalkyl ester monomer of the present invention is represented by the following formula:

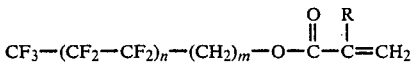

and telomer alcohol methacrylates or acrylates of the following formula:

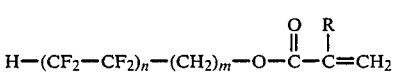

and mixtures thereof; wherein, n is an integer from 1 to 10, m is an integer from 1 to 5 and R is methyl group or hydrogen. Particularly useful in the manufacture of the lenses of the present invention are those fluoroalkyl esters selected from the group consisting of perfluoroalky ethyl acrylates and methacrylates of the following formula:

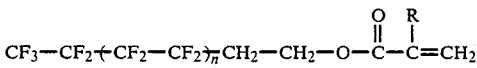

wherein, n is an integer from 1 to 10 and R is methyl group or hydrogen.

The perfluoroalkyl ester monomers of itaconic acid useful in the present invention for the manufacturing of contact lenses are represented by the following formula:

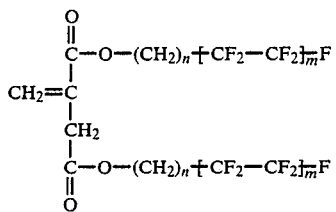

n being an integer from 1 to 4 and m is an integer from 1 to 10.

Additional perfluorocarbon monomers useful in the present invention to form copolymers are found in the European Patent Application No. 0084406 by David E. Rice, et al., such monomers having the following general structural formula:

$$A-CF_2-O-(CF_2-CF_2-O)_m-(CF_2-O)_n-CF_2-Z$$

wherein, m is an integer from 2 to 20, n is an integer from 2 to 30, A is selected from $CF_3-$, $CH_3-$, $CH_2F-$, and $CF_2H-$, and Z has the formula which includes one of the following:

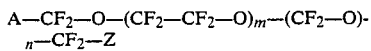

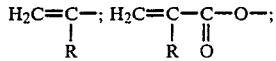

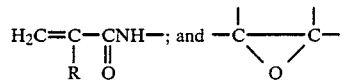

or mixtures thereof.

The principal sulfone monomers embodied in the present invention which contribute to the increased oxygen permeability and strength of the copolymer for contact lenses are represented by the following general structural formula:

wherein, A is selected from one of the following:

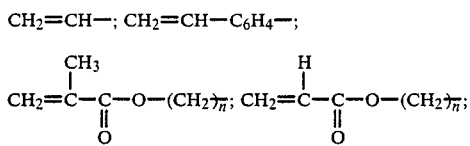

wherein, B is $C_1$ to $C_{20}$, alkyl, cyclic or phenyl groups and n is an integer from 1 to 5.

The preferable sulfone monomers which are useful in the present invention are:
methyl vinyl sulfone,
methyl styrene sulfone,
ethyl vinyl sulfone,
ethyl styrene sulfone,
propyl vinyl sulfone,
propyl styrene sulfone,
phenyl vinyl sulfone,
phenyl styrene sulfone,
cyclohexyl vinyl sulfone,
cyclohexyl styrene sulfone,
pentyl vinyl sulfone,
pentyl styrene sulfone,
butyl vinyl sulfone,
butyl styrene sulfone,
phenoxyethyl vinyl sulfone,
phenoxyethyl styrene sulfone,
divinyl sulfone,
methacryloxyethyl methyl sulfone,
methacryloxyethyl ethyl sulfone,
methacryloxyethyl propyl sulfone,
methacryloxyethyl butyl sulfone,
methacryloxyethyl phenyl sulfone,
methacryloxyethyl pentyl sulfone,
methacryloxyethyl styrene sulfone, and
mixtures thereof.

The copolymer plastic material of the present invention also incorporates hardening agents such as methyl methacrylate, ethyl methacrylate, propyl methacrylate, cyclohexyl methacrylate, glycidyl methacrylate, phenoxyethyl methacrylate, phenyl methacrylate, tetrahydrofurfuryl methacrylate, methyl acrylate, ethyl acrylate, propyl acrylate, cyclohexyl acrylate, phenoxyethyl acrylate, phenyl acrylate, tetrahydrofurfuryl acrylate, dimethyl itaconate, diethyl itaconate, dipropyl itaconate, dicyclohexyl itaconate, diphenyl itaconate, vinyl benzene (styrene), divinyl benzene and equivalents.

The contact lens material is further modified by the incorporation of wettability and cross-linking agents to improve overall performance of the contact lens on the human eye. Such representative monomers of wettability agents are acrylic acid, methacrylic acid, 2-hydroxyethyl acrylate, 2-hydroxyethyl methacrylate, 2,3-dihydroxypropyl acrylate, 2,3-dihydroxypropyl methacrylate, and/or N-vinyl 2-pyrrolidinone or mixtures thereof.

Representative cross-linking agents are ethyleneglycol dimethacrylate, diethyleneglycol dimethacrylate, triethyleneglycol dimethacrylate, tetraethyleneglycol dimethacrylate, dimethacrylate siloxanyl ester monomer (PSX-563A), ethyleneglycol diacrylate, diethyleneglycol diacrylate, triethyleneglycol diacrylate, tetraethyleneglycol diacrylate, divinyl benzene, divinyl sulfone and/or trimethylolpropane trimethacrylate or mixtures thereof.

A variety of other ingredients may be included in the polymerization mixture so that to either enhance or provide specific properties. For example, wettability of the surface of the lens is a very important characteristic for contact lenses to possess in order to provide comfort and good visual acuity. In addition to already disclosed wettability agents named herein, additional ethylenically unsaturated monomers can also be incorporated that have a hydrophilic group such as hydroxy, carboxy, carbonamido sulfonyl, and sulfonamido groups. As an example, it can be 2-carboxyethyl acrylate, 2-carbonamidoethyl methacrylate, 2-sulfoethyl methacrylate, 2-sulfonamidoethyl acrylate, vinyl sulfonic acid, and mixtures thereof.

The preferred composition of the present invention comprises of:
(a) from about 5 to 65 weight percent of ethylenically unsaturated organosiloxanylalkoxy ester monomer of acrylic and/or methacrylic acids and siloxanylalkyl ester monomers of itaconic acid or mixtures thereof;

(b) from about 2 to 30 weight percent of ethylenically unsaturated perfluoralkyl ester monomer or mixtures thereof;

(c) from about 1 to 25 weight percent of ethylenically unsaturated sulfone monomer or mixtures thereof;

(d) from about 10 to 70 weight percent of hardening agent monomer (preferably, methyl methacrylate, cyclohexyl methacrylate and/or dimethyl itaconate) or mixtures thereof;

(e) from about 1 to 18 weight percent of difunctional cross-linking monomer (preferably triethyleneglycol dimethacrylate, tetraethyleneglycol dimethacrylate) or mixtures thereof; and (f) from about 1 to 15 weight percent of wetting agent monomer (preferably methacrylic acid or N-vinyl 2-pyrrolidinone) or mixtures thereof.

The copolymer plastic can also be prepared without perfluoralkyl ester monomer and/or sulfone monomer and the material would still possess high oxygen permeability and good wettability.

The polymerization of the oxygen permeable material for the manufacture of contact lenses disclosed in the present invention is accomplished by using free-radical polymerization, such techniques are disclosed in the prior art.

EXAMPLE 1

This example illustrates the preparation of tris(trimethylsiloxy)methacryloxyethoxysilane, an organosilicone monomer useful in the present invention. To a three-necked, round bottom, 12 liter flask equipped with mechanical stirrer and cooling system is added 5 liters of dry toulene, 2 moles of 2-hydroxyethylmethacrylate and 2 moles plus 10% excess of triethylamine. The flask content is cooled down to about 5° C. When the temperature is reached, start addition of 2 equivalent moles of tris(trimethylsiloxy)chlorosilane; all addition takes about one hour. Then the temperature is raised to 30° C. and the stirring is continued for 6 hours. After the reaction is completed, the white precipitation of triethylamine hydrochloride is filtered off; distillation of toulene proceeds at about 45° C. under aspirator vacuum. The crude product is washed twice with cold water and then 2 times with 5% bicarbonate solution; then the crude product is washed again 2 times with cold water. The crude product is dried over anhydrous MgSO$_4$ for 3 hours; the MgSO$_4$ is removed by filtration and the product is stripped under high vacuum at 75° C. The refractive index $n_D^{25}$ is 1.4112±0.001; the infrared spectrum confirmed the structure. The same procedure is used for the preparation of tris(pentamethyldisiloxanyl)methacryloxyethoxysilane, bis(pentamethyldisiloxanyl)trimethylsiloxanylmethacryloxyethoxysilane, and bis(trimethylsiloxy)pentamethyldisiloxanylmethacryloxyethoxysilane if the starting material tris(trimethylsiloxy)chlorosilane is replaced with pentamethylchlorosilane and trimethylchlorosilane in the desired molar ratio.

EXAMPLE 2

This example illustrates the preparation of the representative perfluoroalkyl ester monomer useful in the present invention. A 12 liter, 3-necked, round bottom flask equiped with a mechanical stirrer and cooling system is charged with 5 liters of toulene, 3 moles of 1,1′,2,2′-tetrahydroperfluorohexanol and 3 moles plus 10% excess of triethylamine. The flask content while stirring is cooled down to about 5°–10° C. until the temperature is reached, then start addition of 1 mole of trichloromethacryloxypropylsilane; all addition takes about one hour. When all addition is completed the temperature of the reaction mixture is raised to 30° C. and stirring is continued for 10 hours. After the reaction is completed, white precipitation of triethylamine hydrochloride is filtered off; distillation of toulene proceeds at about 45° C. under aspirator vacuum. The crude product is washed twice with cold water, then 2 times with 5% sodium bicarbonate solution and then the crude product is washed again 2 times with cold water. The crude product is dried over anhydrous MgSO$_4$ for 3 hours; the MgSO$_4$ is removed by filtration and the product is stripped under high vacuum at 75° C. The monomer is then ready to be used in the polymerization process.

EXAMPLE 3

This example is an illustration of the preparation of 2,3-di[tris(trimethylsiloxy)siloxanyl]methacryloxypropane. The 12 liter flask equipment with a mechanical stirrer, additional funnel and cooling system is charged with 5 liters of toulene, 2 moles of 2,3-dihydroxypropylmethacrylate and 2 moles plus 10% excess of triethylamine. The contents of the flask is cooled down to 5° C., then addition of 2 moles of tris(trimethylsiloxy)chlorosilane proceeds in about a period of one hour. When all addition is completed the temperature of the reaction mixture is elevated to 30° C. and stirring is continued for about 8 hours. After the reaction is completed, white precipitation of triethylamine hydrochloride is filtered off; distillation of toulene proceeds at about 45° C. under aspirator vacuum. The crude product is washed twice with cold water and 2 times with 5% sodium bicarbonate solution and then the crude product is washed again 2 times with cold water. The crude product is dried over anhydrous MgSO$_4$ for 3 hours; the MgSO$_4$ is removed by filtration and the product is stripped under high vacuum at 75° C. The refractive index of the product is 1.4083±0.002. The same procedure is used for the preparation of 2,3-di(pentamethyldisiloxanyl)methacryloxypropane if the starting material tris(trimethylsiloxy)chlorosilane is replaced with pentamethylchlorodisiloxane.

EXAMPLE 4

This example illustrates the preparation of representative copolymer material for contact lenses. To a 200 ml flask is added 35 grams of organosilicone monomer previously prepared in Example 1, tris(trimethylsiloxy)methacryloxyethoxysilane, 15 grams of 2,3-di[tris(trimethylsiloxy)siloxanyl]methacryloxypropane, 2 grams of methacrylate dimer (PSX-563A), 10 grams of cyclohexyl methacrylate, 5 grams of methacrylic acid, 2.5 grams of N-vinyl 2-pyrrolidinone, 5 grams of perfluoro monomer prepared in Example 2, 10 grams of triethyleneglycol dimethacrylate, 14 grams of methyl methacrylate, 5 drops of D&C #6 color dye, 0.5 ml of t-butyl peroxypivalate and 0.2 grams of benzoyl peroxide. All contents are mixed thoroughly and poured into polypropylene tubes, molds or sililated glass tubes, closed and polymerized in water bath at 40° C. for a period of about 18 hours. The rods are then put into a thermostated oven for at least 24 hours, having a temperature of about 100° C. The copolymer plastic is transparent, hard and suitable for the machining of highly permeable contact lenses.

EXAMPLE 5

This example illustrates the preparation of representative copolymer plastic material for contact lenses made only from siloxanyl monomer as a source of oxygen permeability. To the 200 ml flask is added 41 grams of 2,3,-di[tris(trimethylsiloxy)siloxanyl]methacryloxypropane, 10 grams of cyclohexyl methacrylate, 4.5 grams of methacrylic acid, 5 grams of diethyleneglycol dimethacrylate, 39 grams of methyl methacrylate, 0.4 grams of t-butyl peroxyoctoate and 0.1 grams of benzoyl peroxide, all components are mixed thoroughly and poured into polypropylene tubes, molds or sililated glass tubes closed with stoppers and polymerized in a water bath or thermostated oven set at 45° C. for a period of about 20 hours. The rods or blanks are then put into a thermostated oven preheated at 105° C. for a period of 24 hours. The copolymer plastic is transparent, hard, oxygen permeable, wettable and suitable for manufacturing oxygen permeable contact lenses.

EXAMPLE 6-13

This example illustrates the preparation of optically clear plastic prepared in accordance with the polymerization procedure described in Example 5, except the amounts and kinds of monomers may be different as shown in the following table:

TABLE

| Components (Parts) | 6 | 7 | 8 | 9 | 10 | 11 | 12 | 13 |
|---|---|---|---|---|---|---|---|---|
| 2,3-di [tris(trimethylsiloxy)siloxanyl]methacryloxypropane | 35 | 30 | 20 | 10 | 0 | 15 | 20 | 20 |
| tris(trimethylsiloxy)methacryloxyethoxysilane | 0 | 10 | 20 | 30 | 40 | 0 | 15 | 15 |
| tris(dimethylhydrosiloxy)methacryloxypropylsilane | 5 | 0 | 5 | 0 | 10 | 15 | 5 | 10 |
| methacryloxymethylpentamethyldisiloxane | 0 | 5 | 0 | 0 | 15 | 5 | 0 | 0 |
| cyclohexyl methacrylate | 12 | 10 | 5 | 0 | 10 | 6 | 10 | 0 |
| dimethyl itaconate | 10 | 5 | 20 | 20 | 0 | 10 | 0 | 30 |
| triethyleneglycol dimethacrylate | 6 | 8 | 7 | 5 | 4 | 10 | 6 | 8 |
| methyl methacrylate | 25 | 28 | 30 | 30 | 25 | 30 | 40 | 0 |
| methacrylic acid | 5 | 45 | 0 | 5 | 4 | 6 | 0 | 4 |
| N—vinyl 2-pyrrolidinone | 3 | 0 | 6 | 0 | 3 | 0 | 5 | 2 |
| vinyl benzene | 0 | 5 | 0 | 3 | 4 | 10 | 0 | 10 |

EXAMPLE 14

This example illustrates the preparation of oxygen permeable copolymer plastic for contact lenses made from siloxanylalkoxy ester monomer and perfluoroalkyl ester monomer as a source of oxygen permeability. To a 200 ml flask is added 35 parts of bis(pentamethyldisiloxanyl)trimethylsiloxymethacryloxyethoxysilane, 15 parts of cyclohexyl methacrylate, 10 parts of tris(1,1'-dihydroperfluorohexyloxy)methacryloxypropylsilane, 3 parts of N-vinyl 2-pyrrolidinone, 7 parts of tetraethyleneglycol dimethacrylate, 5 parts of methacrylic acid, 25 parts of methyl methacrylate, 0.5 parts of t-butyl peroxypivalate and 0.2 parts of benzoyl peroxide; the polymerization is carried out by the same procedure as described in Example 5. The resulting plastic is transparent, hard, stable, wettable and suitable for machining of highly permeable contact lenses.

EXAMPLE 15-22

Samples of optically clear plastic are prepared in accordance with the polymerization procedure described in Example 14, except the amounts and kinds of components may be different, as shown in the following table:

TABLE

| Components (Parts) | 15 | 16 | 17 | 18 | 19 | 20 | 21 | 22 |
|---|---|---|---|---|---|---|---|---|
| tris(1,1'-dihydroperfluorohexyloxy)methacryloxypropylsilane | 10 | 0 | 5 | 20 | 40 | 20 | 20 | 15 |
| bis(1,1',2,2'tetrahydroperfluorobutyl)itaconate | 0 | 15 | 5 | 0 | 0 | 5 | 3 | 5 |
| 2,3-di [tris(trimethylsiloxy)siloxanyl]methacryloxypropane | 30 | 25 | 10 | 20 | 20 | 5 | 0 | 10 |
| tris(trimethylsiloxy)methacryloxyethoxysilane | 10 | 15 | 25 | 5 | 0 | 30 | 40 | 20 |
| di(pentamethyldisiloxanylethyl)itaconate | 5 | 0 | 5 | 10 | 5 | 5 | 5 | 8 |
| dimethyl itaconate | 10 | 0 | 6 | 10 | 30 | 15 | 0 | 12 |
| methyl methacrylate | 20 | 30 | 18 | 10 | 10 | 20 | 18 | 20 |
| cyclohexyl methacrylate | 10 | 15 | 8 | 20 | 0 | 0 | 15 | 0 |
| methacrylic acid | 3 | 4 | 5 | 1 | 3 | 5 | 3 | 6 |
| N—vinyl 2-pyrrolidinone | 0 | 3 | 2 | 6 | 2 | 0 | 4 | 0 |
| vinyl benzene | 0 | 2 | 6 | 0 | 3 | 8 | 0 | 0 |
| diethyleneglycol dimethacrylate | 6 | 0 | 2 | 4 | 6 | 0 | 0 | 1 |
| triethyleneglycol dimethacrylate | 0 | 6 | 3 | 4 | 0 | 6 | 10 | 6 |

*All samples of the above copolymer plastic are clear, transparent and gas permeable.

EXAMPLE 23

This example illustrates the preparation of oxygen permeable copolymer plastic for contact lenses from siloxanylalkoxy ester of methacrylic acid and sulfone monomer as a source of oxygen permeability; consisting of 40 parts of tris(trimethylsiloxy)methacryloxyethoxysilane, 10 parts of cyclohexyl methacrylate, 8 parts of methyl vinyl sulfone, 20 parts of tetrahydrofurfuryl methacrylate, 5 parts of 2-hydroxyethyl methacrylate, 7 parts of N-vinyl 2-pyrrolidinone, 7 parts of methyl methacrylate and 0.4 parts of t-butyl peroxypivalate are polymerized. The resulting copolymer plastic has a hardness of 86±2 as measured on the Shore D (ASTM-2240) hardness tester.

EXAMPLE 24

A contact lens has been manufactured from the oxygen permeable material of the present invention using standard, conventional manufacturing techniques known in the art. The base curve of the lens was cut at 7.80 mm, the front curve of the lens was cut at 8.21 mm, the center thickness of the lens was 0.19 mm. The contact lens was then polished using a technique widely known in the contact lens industry. The base curve of the lens was 7.81 mm; after the lens was polished the base curve remained at 7.81 mm. The lens was soaked over 72 hours in Soaclens solution and the base curve remained at 7.81 mm.

EXAMPLE 25-32

Samples of optically clear plastic are prepared in accordance with the polymerization procedure described in Example 4, except the amounts and kinds of components may be different as shown in the following table:

| Components (Parts) | 25 | 26 | 27 | 28 | 29 | 30 | 31 | 32 |
|---|---|---|---|---|---|---|---|---|
| tris(trimethylsiloxy)methacryloxyethoxysilane | 25 | 40 | 30 | 40 | 30 | 45 | 10 | 0 |
| tris(trimethylsiloxy)-methacryloxypropylsilane | 10 | 0 | 10 | 5 | 10 | 0 | 20 | 30 |
| 1,1',2,2'-tetrahydroperfluorohexyl methacrylate | 10 | 5 | 0 | 10 | 2 | 0 | 5 | 0 |
| tris(1,1'-dihydroperfluorobutyloxy)methacryloxypropylsilane | 5 | 0 | 5 | 0 | 2 | 10 | 0 | 20 |
| methyl vinyl sulfone | 0 | 5 | 6 | 0 | 10 | 0 | 10 | 10 |
| methyl methacrylate | 30 | 30 | 29 | 30 | 21 | 35 | 30 | 15 |
| cyclohexyl methacrylate | 10 | 10 | 11 | 10 | 10 | 0 | 10 | 15 |
| methacrylic acid | 5 | 5 | 4 | 2 | 5 | 5 | 5 | 4 |
| diethleneglycol dimethacrylate | 5 | 5 | 5 | 3 | 10 | 5 | 10 | 6 |

*All samples of the above copolymer plastic are hard, transparent and easily machinable.

EXAMPLE 33

The polymerization of a mixture of 20 parts of 2,3-di[-tris(trimethylsiloxy)siloxanyl]methacryloxypropane, 20 parts of tris(trimethylsiloxy)methacryloxypropylsilane, 10 parts of bis(1,1',5-trihydroperfluoropentyl)itaconate, 10 parts of cyclohexyl methacrylate, 8 parts of ethyleneglycol dimethacrylate, 4 parts of methacrylic acid, 3 parts of N-vinyl 2-pyrrolidinone and 25 parts of methyl methacrylate are polymerized by using a free-radical catalysts, as shown in Example 5, in polypropylene base curve premolded caps. The resulting plastic gives a transparent, concave plug.

EXAMPLE 34

The polymerization procedure of Example 5 is repeated, except the amounts and kinds of components in the polymerization are changed as follows: 45 parts of tris(trimethylsiloxy)siloxanylmethacryloxyethoxysilane, 10 parts of tris(1,1',2,2'-tetrahydroperfluoropentyloxy)methacryloxypropylsilane, 10 parts of cyclohexyl methacrylate, 9 parts of triethyleneglycol dimethacrylate, 5 parts of methacrylic acid, 3 parts of N-vinyl 2-pyrrolidinone and 18 parts of methyl methacrylate are polymerized by using free-radical initiator at 47° C. The plastic is then removed from the molds, transferred into a thermostated oven which is set at 108° C. and the copolymer plastic is cured for an additional 24 hours. The resulting plastic has an oxygen permeability of about $91 \times 10^{-11}$ (cm$^2$/sec)(ml O$_2$/ml $\times$ mm Hg) at 35° C., as analyzed on the Schema-Versatae Model #920 instrument (an analytical technique widely used in the industry).

The embodiments of the invention which are claimed as an exclusive property or priviledge are defined as follows:

1. An oxygen permeable contact lens consisting essentially of an organic polymer selected from the group consisting of organosiloxanylalkoxy ester monomer of acrylic and methacrylic acid which has the structural formula:

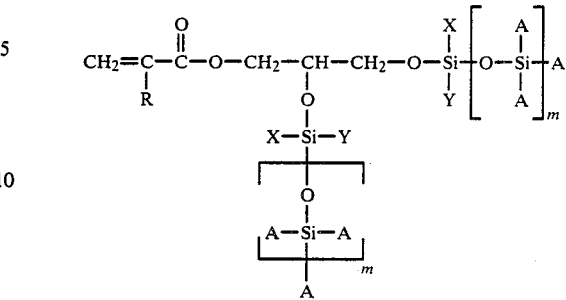

wherein A is $C_1$ to $C_6$ alkyl, cycloalkyl or phenyl, X and Y are $C_1$ to $C_6$, alkyl, cyclic or phenyl groups and/or groups of the following structure:

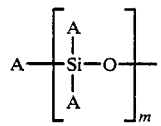

m being an integer from 1 to 5 and R is methyl group or hydrogen; and an organosiloxanylalkoxy ester monomer of acrylic or methacrylic acid having the following structural formula:

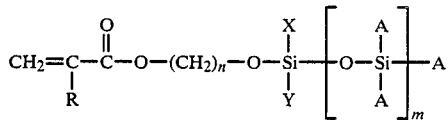

n being an integer from 1 to 3, wherein X and Y are $C_1$ to $C_6$, alkyl, cyclic or phenyl groups or groups of the following structure:

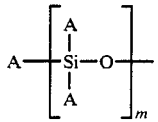

m being an integer from 1 to 5 and R is methyl group or hydrogen, wherein the contact lens has an oxygen permeability of about $91 \times 10^{-11}$ (cm$^2$/sec) (ml O$_2$/ml $\times$ mmHg) at 35° C.

2. An oxygen permeable contact lens consisting essentially of from about 5 to 70 weight percent of a monomer selected from the group consisting of organosiloxanylalkoxy ester monomer of acrylic and methacrylic acids having the following formula:

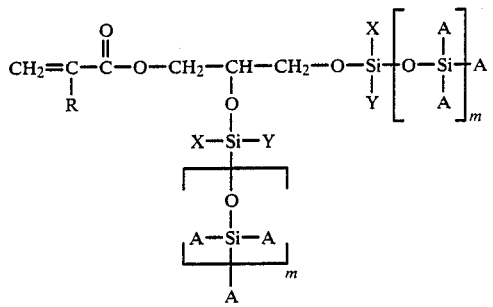

wherein A is $C_1$ to $C_6$ alkyl, cycloalkyl or phenyl; X and Y are $C_1$ to $C_6$, alkyl, cyclic or phenyl groups or groups of the following structure:

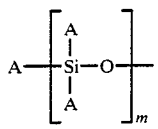

m being an integer from 1 to 5 and R is methyl group or hydrogen; and an organosiloxanylalkoxy ester monomer of acrylic or methacrylic acid having the following structural formula:

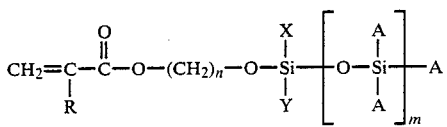

n being an integer from 1 to 3, wherein X and Y are $C_1$ to $C_6$, alkyl, cyclic or phenyl groups or groups of the following structure:

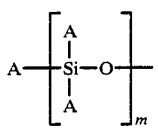

m being an integer from 1 to 5 and R is methyl group or hydrogen; said organosiloxanylalkoxy ester monomers of acrylic or methacrylic acid being partially substituted with organosiloxanylalkyl ester monomers having the following structural formula:

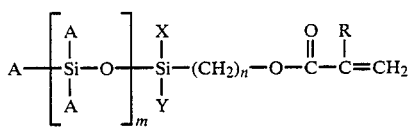

wherein X and Y are $C_1$ to $C_6$, alkyl, cyclic or phenyl groups or groups of the following structure:

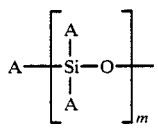

m being an integer from 1 to 6, n being an integer from 1 to 3 and R is methyl group or hydrogen; or the formula:

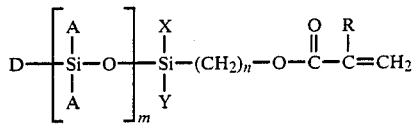

wherein X and Y are $C_1$ to $C_6$, alkyl, cyclic or phenyl groups or groups of the following structure:

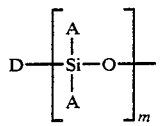

m being an integer from 1 to 6, n being an integer from 1 to 3, A is selected form $C_1$ to $C_6$, alkyl or phenyl groups, R is methyl group or hydrogen and D is hydrogen or hydroxy group; or the formula:

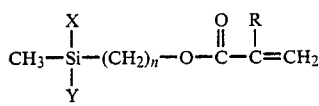

wherein X and Y are groups of the following structure:

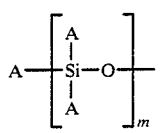

m being an integer from 1 to 5, n is an integer from 1 to 3, wherein A is selected from $C_1$ to $C_6$, alkyl, cyclic or phenyl groups and R is methyl group or hydrogen; or the following formula:

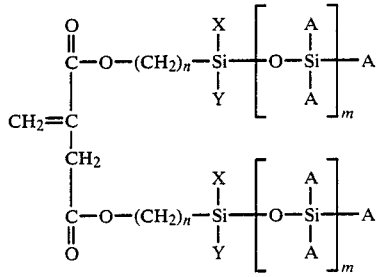

wherein X and Y are $C_1$ to $C_6$, alkyl, cyclic or phenyl groups or groups of the following structure:

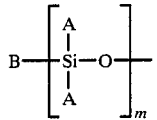

m being an integer from 1 to 5, n being an integer from 1 to 3, wherein A is selected from the group consisting of $C_1$ to $C_6$, alkyl, cyclic and phenyl groups and B is methyl group, hydrogen or hydroxy group, wherein the contact lens has an oxygen permeability of about $91 \times 10^{-11}$ $(cm^2/sec)$ $(ml/O_2/ml \times mmHg)$ at 35° C.

* * * * *